United States Patent
Lim

(10) Patent No.: US 9,315,008 B1
(45) Date of Patent: Apr. 19, 2016

(54) METHOD AND APPARATUS FOR ALIGNING AN ILLUMINATION UNIT TO A SLIDER FOR A MAGNETIC RECORDING DEVICE

(71) Applicant: Western Digital Technologies, Inc., Irvine, CA (US)

(72) Inventor: Chee Kheng Lim, Pakkret (TH)

(73) Assignee: Western Digital Technologies, Inc., Irvine, CA (US)

( * ) Notice: Subject to any disclaimer, the term of this patent is extended or adjusted under 35 U.S.C. 154(b) by 243 days.

(21) Appl. No.: 13/969,782

(22) Filed: Aug. 19, 2013

Related U.S. Application Data

(60) Provisional application No. 61/846,868, filed on Jul. 16, 2013.

(51) Int. Cl.
*B32B 41/00* (2006.01)

(52) U.S. Cl.
CPC ...................................... *B32B 41/00* (2013.01)

(58) Field of Classification Search
CPC ............... Y10T 29/49037; Y10T 29/49041; Y10T 29/49055; H01L 2223/54426; H01L 2224/81121; H01L 2224/81801
USPC .............. 156/64, 350, 360, 363, 378, 379
See application file for complete search history.

(56) References Cited

U.S. PATENT DOCUMENTS

| | | | |
|---|---|---|---|
| 6,075,673 A | 6/2000 | Wilde et al. |
| 6,097,575 A | 8/2000 | Trang et al. |
| 6,125,014 A | 9/2000 | Riedlin, Jr. |
| 6,125,015 A | 9/2000 | Carlson et al. |
| 6,130,863 A | 10/2000 | Wang et al. |
| 6,137,656 A | 10/2000 | Levi et al. |
| 6,144,528 A | 11/2000 | Anaya-Dufresne et al. |
| 6,147,838 A | 11/2000 | Chang et al. |
| 6,151,196 A | 11/2000 | Carlson et al. |
| 6,178,064 B1 | 1/2001 | Chang et al. |
| 6,181,522 B1 | 1/2001 | Carlson |
| 6,181,673 B1 | 1/2001 | Wilde et al. |
| 6,229,672 B1 | 5/2001 | Lee et al. |
| 6,236,543 B1 | 5/2001 | Han et al. |
| 6,246,547 B1 | 6/2001 | Bozorgi et al. |
| 6,249,404 B1 | 6/2001 | Doundakov et al. |
| 6,330,131 B1 | 12/2001 | Nepela et al. |
| 6,339,518 B1 | 1/2002 | Chang et al. |
| 6,349,017 B1 | 2/2002 | Schott |
| 6,373,660 B1 | 4/2002 | Lam et al. |
| 6,378,195 B1 | 4/2002 | Carlson |
| 6,522,504 B1 | 2/2003 | Casey |
| 6,538,850 B1 | 3/2003 | Hadian et al. |
| 6,583,953 B1 | 6/2003 | Han et al. |

(Continued)

OTHER PUBLICATIONS

U.S. Appl. No. 14/216,610, filed Mar. 17, 2014, to Ouyang et al., 23 pages.

*Primary Examiner* — Michael N Orlando
*Assistant Examiner* — Joshel Rivera

(57) ABSTRACT

An alignment method for bonding a first component to a second component is described. A plurality of sliders having alignment markers are substantially aligned to the alignment markers of a plurality of illumination units and then positioned into alignment by moving the slider with respect to the illumination unit by an offset. The offset is calculated by scanning a light source around the waveguide to determine the distance that the alignment markers of the slider are separated from the alignment markers on the illumination unit.

13 Claims, 5 Drawing Sheets

(56) References Cited

U.S. PATENT DOCUMENTS

| | | |
|---|---|---|
| 6,646,832 B2 | 11/2003 | Anaya-Dufresne et al. |
| 6,661,612 B1 | 12/2003 | Peng |
| 6,665,146 B2 | 12/2003 | Hawwa et al. |
| 6,690,545 B1 | 2/2004 | Chang et al. |
| 6,704,173 B1 | 3/2004 | Lam et al. |
| 6,708,389 B1 | 3/2004 | Carlson et al. |
| 6,717,773 B2 | 4/2004 | Hawwa et al. |
| 6,721,142 B1 | 4/2004 | Meyer et al. |
| 6,744,599 B1 | 6/2004 | Peng et al. |
| 6,771,468 B1 | 8/2004 | Levi et al. |
| 6,796,018 B1 | 9/2004 | Thornton |
| 6,801,402 B1 | 10/2004 | Subrahmanyam et al. |
| 6,856,489 B2 | 2/2005 | Hawwa et al. |
| 6,873,496 B1 | 3/2005 | Sun et al. |
| 6,912,103 B1 | 6/2005 | Peng et al. |
| 6,937,439 B1 | 8/2005 | Chang et al. |
| 6,956,718 B1 | 10/2005 | Kulkarni et al. |
| 6,972,930 B1 | 12/2005 | Tang et al. |
| 7,006,330 B1 | 2/2006 | Subrahmanyam et al. |
| 7,006,331 B1 | 2/2006 | Subrahmanyam et al. |
| 7,010,847 B1 | 3/2006 | Hadian et al. |
| 7,019,945 B1 | 3/2006 | Peng et al. |
| 7,027,264 B1 | 4/2006 | Subrahmanyam et al. |
| 7,085,104 B1 | 8/2006 | Hadian et al. |
| 7,099,117 B1 | 8/2006 | Subrahmanyam et al. |
| 7,174,622 B2 | 2/2007 | Meyer et al. |
| 7,289,299 B1 | 10/2007 | Sun et al. |
| 7,307,816 B1 | 12/2007 | Thornton et al. |
| 7,315,435 B1 | 1/2008 | Pan |
| 7,315,436 B1 | 1/2008 | Sanchez |
| 7,333,175 B2 | 2/2008 | Baselmans |
| 7,414,814 B1 | 8/2008 | Pan |
| 7,436,631 B1 | 10/2008 | Fanslau, Jr. et al. |
| 7,474,508 B1 | 1/2009 | Li et al. |
| 7,477,486 B1 | 1/2009 | Sun et al. |
| 7,593,190 B1 | 9/2009 | Thornton et al. |
| 7,595,963 B1 | 9/2009 | Chen et al. |
| 7,616,405 B2 | 11/2009 | Hu et al. |
| 7,729,089 B1 | 6/2010 | Hogan |
| 7,791,212 B2 | 9/2010 | Takahashi et al. |
| 7,804,656 B2 | 9/2010 | Gomez et al. |
| 7,821,880 B2 | 10/2010 | Tanaka et al. |
| 7,924,658 B2 | 4/2011 | Shimazawa et al. |
| 7,930,817 B2 | 4/2011 | Takayama et al. |
| 7,957,099 B2 | 6/2011 | Tanaka et al. |
| 7,995,310 B1 | 8/2011 | Pan |
| 8,081,400 B1 | 12/2011 | Hu |
| 8,087,973 B1 | 1/2012 | Sladek et al. |
| 8,089,730 B1 | 1/2012 | Pan et al. |
| 8,149,653 B2 | 4/2012 | Shimazawa et al. |
| 8,164,858 B1 | 4/2012 | Moravec et al. |
| 8,199,437 B1 | 6/2012 | Sun et al. |
| 8,208,224 B1 | 6/2012 | Teo et al. |
| 8,218,268 B1 | 7/2012 | Pan |
| 8,240,545 B1 | 8/2012 | Wang et al. |
| 8,248,898 B2 | 8/2012 | Schreck et al. |
| 8,254,212 B2 | 8/2012 | Snyder et al. |
| 8,256,272 B1 | 9/2012 | Roajanasiri et al. |
| 8,274,867 B2 | 9/2012 | Mori et al. |
| 8,295,012 B1 | 10/2012 | Tian et al. |
| 8,295,013 B1 | 10/2012 | Pan et al. |
| 8,295,014 B1 | 10/2012 | Teo et al. |
| 8,320,084 B1 | 11/2012 | Shum et al. |
| 8,325,446 B1 | 12/2012 | Liu et al. |
| 8,325,447 B1 | 12/2012 | Pan |
| 8,339,742 B1 | 12/2012 | Sladek et al. |
| 8,339,747 B1 | 12/2012 | Hales et al. |
| 8,339,748 B2 | 12/2012 | Shum et al. |
| 8,339,905 B2 | 12/2012 | Rausch et al. |
| 8,341,825 B2 | 1/2013 | Hara et al. |
| 8,343,363 B1 | 1/2013 | Pakpum et al. |
| 8,345,517 B2 | 1/2013 | Hurley et al. |
| 8,345,519 B1 | 1/2013 | Pan |
| 8,385,183 B2 | 2/2013 | Peng et al. |
| 8,418,353 B1 | 4/2013 | Moravec et al. |
| 8,424,191 B2 | 4/2013 | Shimazawa et al. |
| 8,437,228 B2 | 5/2013 | Matsushima et al. |
| 8,441,896 B2 | 5/2013 | Wang et al. |
| 8,446,694 B1 | 5/2013 | Tian et al. |
| 8,456,643 B2 | 6/2013 | Prabhakaran et al. |
| 8,456,776 B1 | 6/2013 | Pan |
| 8,456,961 B1 | 6/2013 | Wang et al. |
| 8,462,462 B1 | 6/2013 | Moravec et al. |
| 8,477,459 B1 | 7/2013 | Pan |
| 8,477,571 B1 | 7/2013 | Zhou et al. |
| 8,485,579 B2 | 7/2013 | Roajanasiri et al. |
| 8,488,279 B1 | 7/2013 | Pan et al. |
| 8,488,281 B1 | 7/2013 | Pan |
| 8,490,211 B1 | 7/2013 | Leary |
| 8,514,522 B1 | 8/2013 | Pan et al. |
| 8,533,936 B1 | 9/2013 | Puttichaem et al. |
| 8,545,164 B2 | 10/2013 | Choumwong et al. |
| 8,553,365 B1 | 10/2013 | Shapiro et al. |
| 8,587,901 B1 | 11/2013 | Puttichaem et al. |
| 8,593,764 B1 | 11/2013 | Tian et al. |
| 8,599,653 B1 | 12/2013 | Mallary et al. |
| 8,605,389 B1 | 12/2013 | Pan et al. |
| 8,611,050 B1 | 12/2013 | Moravec et al. |
| 8,611,052 B1 | 12/2013 | Pan et al. |
| 8,623,197 B1 | 1/2014 | Kobsiriphat et al. |
| 8,624,184 B1 | 1/2014 | Souza et al. |
| 8,665,566 B1 | 3/2014 | Pan et al. |
| 8,665,567 B2 | 3/2014 | Shum et al. |
| 8,665,677 B1 | 3/2014 | Panitchakan et al. |
| 8,665,690 B1 | 3/2014 | Moravec et al. |
| 8,693,144 B1 | 4/2014 | Pan et al. |
| 8,756,795 B1 | 6/2014 | Moravec et al. |
| 8,758,083 B1 | 6/2014 | Rudy et al. |
| 8,760,812 B1 | 6/2014 | Chen et al. |
| 8,770,463 B1 | 7/2014 | Puttichaem et al. |
| 8,773,664 B1 | 7/2014 | Wang et al. |
| 8,792,212 B1 | 7/2014 | Pan et al. |
| 8,792,213 B1 | 7/2014 | Vijay et al. |
| 8,797,691 B1 | 8/2014 | Tian et al. |
| 2013/0244541 A1 | 9/2013 | Yaemglin et al. |
| 2013/0293982 A1 | 11/2013 | Huber |

METHOD AND APPARATUS FOR ALIGNING AN ILLUMINATION UNIT TO A SLIDER FOR A MAGNETIC RECORDING DEVICE

CROSS REFERENCE TO RELATED APPLICATIONS

This application claims priority to U.S. Provisional Patent Application No. 61/846,868 entitled "METHOD AND APPARATUS FOR ALIGNING AN ILLUMINATION UNIT TO A SLIDER FOR A MAGNETIC RECORDING DEVICE, filed on Jul. 16, 2013 for Chee Kheng Lim, which is incorporated herein by reference.

BACKGROUND

Heat assisted magnetic recording (HAMR) typically uses a laser source to provide additional energy to magnetic media during the data writing process. The laser source may include a submount assembly, which together is referred to as a Chip-On-Submount-Assembly (COSA). The COSA is attached to the back of a conventional magnetic head slider and light energy from a laser diode chip is guided to the air bearing surface through a waveguide to heat the magnetic media.

To ensure that the laser diode output is efficiently coupled to the waveguide on a slider it is desirable to accurately bond the slider to the laser source. Aligning the laser source and the slider to the desired position is time consuming and prone to error. The manufacturing yield for fabricating magnetic devices may be adversely affected due to misalignment of the laser with respect to the slider. Therefore, a need exists for a simplified alignment method that accurately aligns a slider to an illumination unit and that improves manufacturing yield.

DETAILED DESCRIPTION

A hybrid active and passive alignment method is provided for bonding a first and second component together for use in a magnetic recording device. In certain embodiments, the method achieves high throughput without compromising the alignment accuracy and alignment yield of the components. In one embodiment, the first component comprises a slider and the second component comprises an illumination unit.

Figure 1:
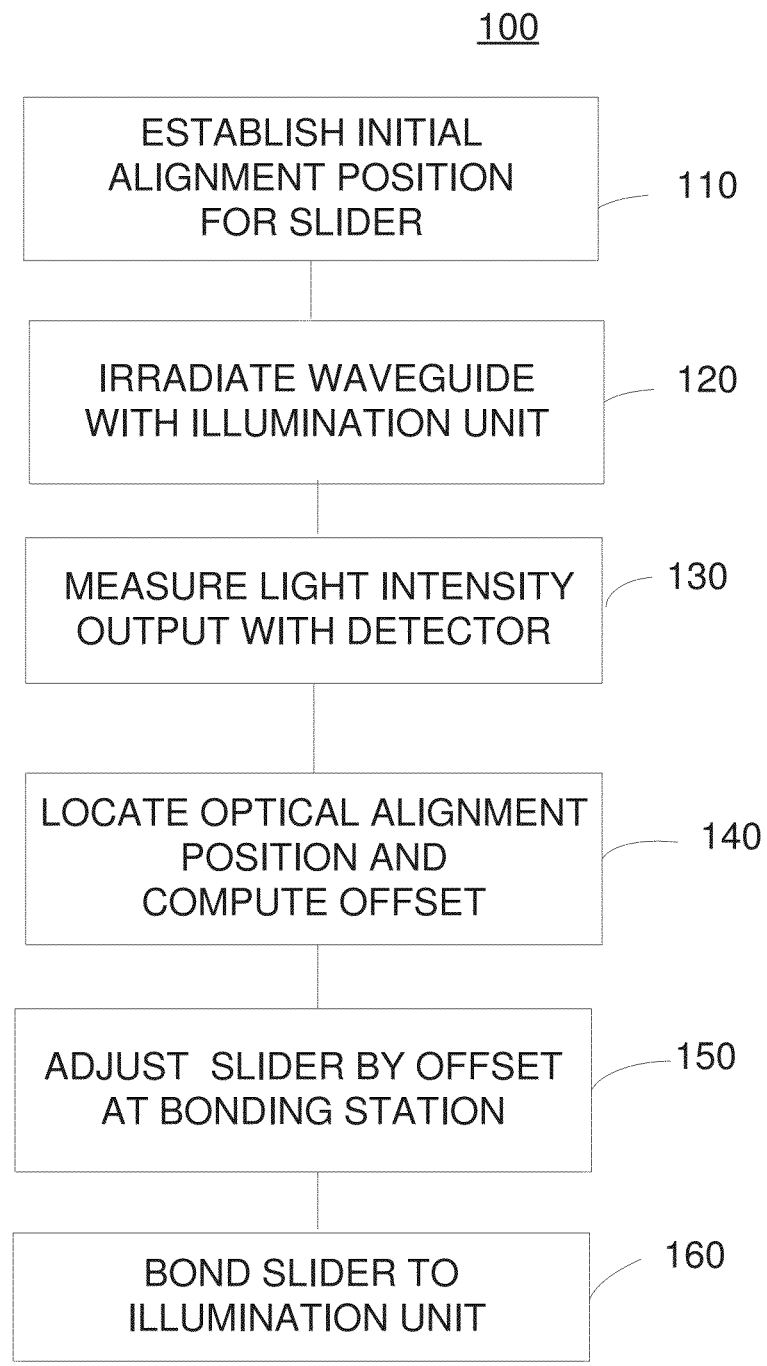
FIG. 1 is a flow diagram that illustrates an alignment method according to one embodiment.

FIG. 1 is a flow diagram illustrating a method for aligning a first component to a second component according to one embodiment. The process starts by establishing an initial alignment position of a slider via block 110. This involves identifying the location of the alignment markers on a reference slider, and then substantially aligning the slider's alignment markers to alignment markers on an illumination unit. The initial alignment position will later be used to calculate an offset for passive alignment.

The process proceeds by irradiating a waveguide on a reference slider with a laser or an illumination unit according to block 120. Either a collimated or uncollimated illumination unit may be used. A detector monitors the light intensity output by the laser via block 130 to locate an optical alignment position. Upon establishing optical alignment, an offset may be calculated via block 140. Each slider is subsequently moved from its initial alignment position by the offset prior to bonding to the illumination unit in accordance with block 150. Then the sliders are separately bonded to a corresponding illumination unit via block 160.

Figure 2:
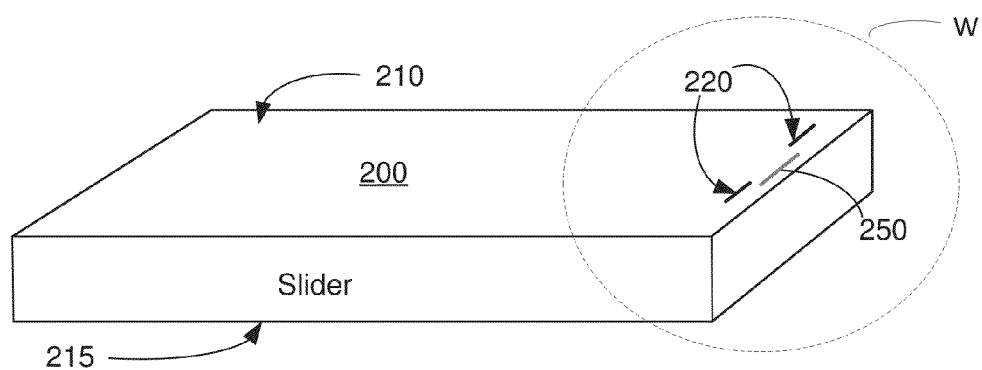
FIG. 2 is a perspective view of a slider with alignment marks and a waveguide.

The method of FIG. 1 will be discussed in further detail in association with FIGS. 2-7. FIG. 2 is a simplified drawing of a slider 200 having a waveguide 250 on top surface 210. The waveguide 250 is located between alignment markers 220 on the slider 200, and extends from top surface 210 to bottom surface 215. Although in other embodiments, the waveguide 250 is not necessarily located between the alignment markers 220.

Figure 2A:
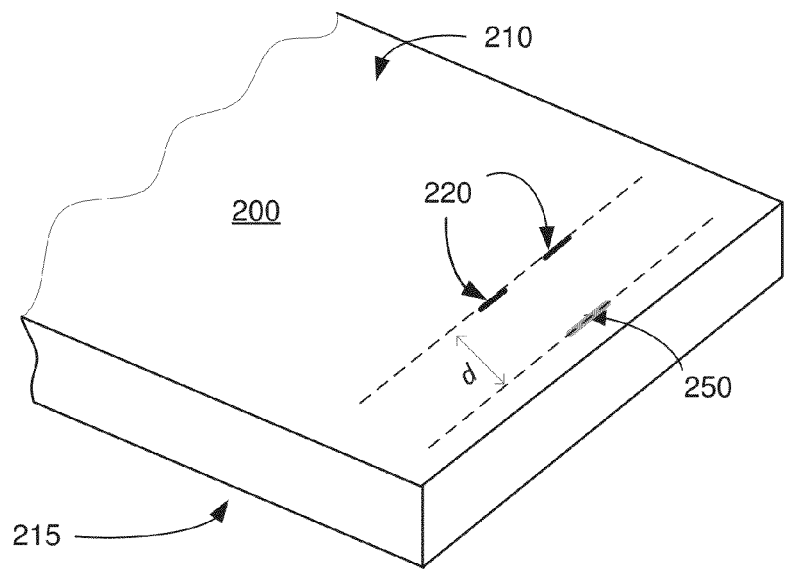
FIG. 2A is an enlarged view of section W of FIG. 2.

FIG. 2A is an enlarged view of section W of FIG. 2. Distance d represents an offset, which corresponds to the manufacturing tolerance or variance of slider 200, and may include other manufacturing tolerances. Thus, offset d reflects the misalignment of waveguide 250 from alignment markers 220 on slider 200. Offset d is used to precisely align other sliders 200 to illumination units 285 (discussed in reference to FIG. 5) based on the distance separating the initial alignment position and the optical alignment position of a reference slider. The reference slider resembles slider 200 and is selected from sliders manufactured from the same wafer or wafer section. The manner by which various elements on slider 200 are located is described below in reference to FIG. 3.

Figure 3:
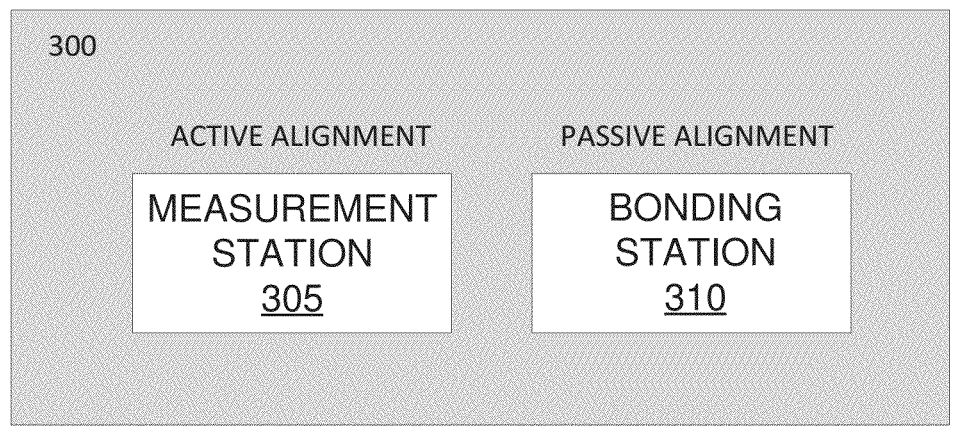
FIG. 3 illustrates an alignment apparatus that includes an active alignment station and a passive alignment station according to one embodiment.

The alignment apparatus 300 of FIG. 3 includes two stations: a measurement station 305 and a bonding station 310. Measurement station 305 may utilize a high resolution vision recognition camera to locate alignment markers 220 on a reference slider. The alignment markers 220 are then used to approximately determine the waveguide position, since waveguide 250 is not generally visible even with a high resolution optical system. The corrected alignment position is later determined by the active alignment portion of alignment apparatus 300.

The waveguide position coordinate data determined at measurement station 305 may be dynamically transmitted to the bonding station 310 to ensure that slider 200 is adjusted by the offset d prior to bonding. In certain embodiments, this adjustment substantially increases the likelihood that the output of a laser is correctly aligned to waveguide 250. Slider 200 may then be eutectic bonded to illumination unit 285 using a conventional soldering process or other adhesion method.

Figure 4:
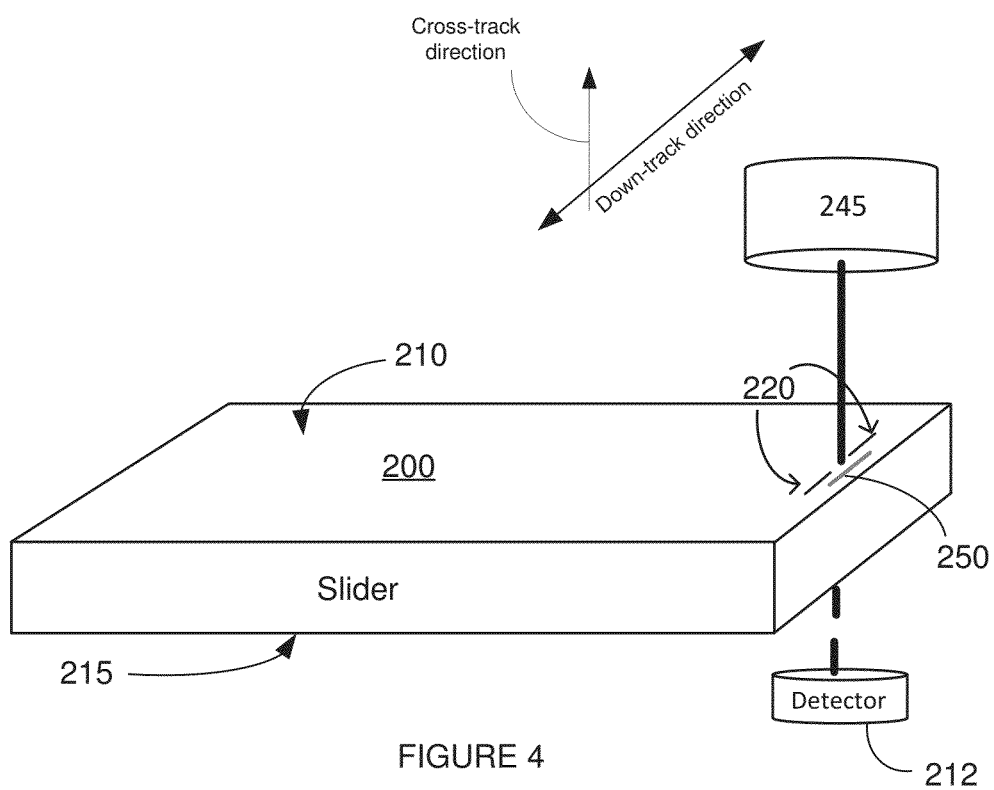
FIG. 4 illustrates a laser irradiating the area of a waveguide in a cross-track direction.
Figure 5:
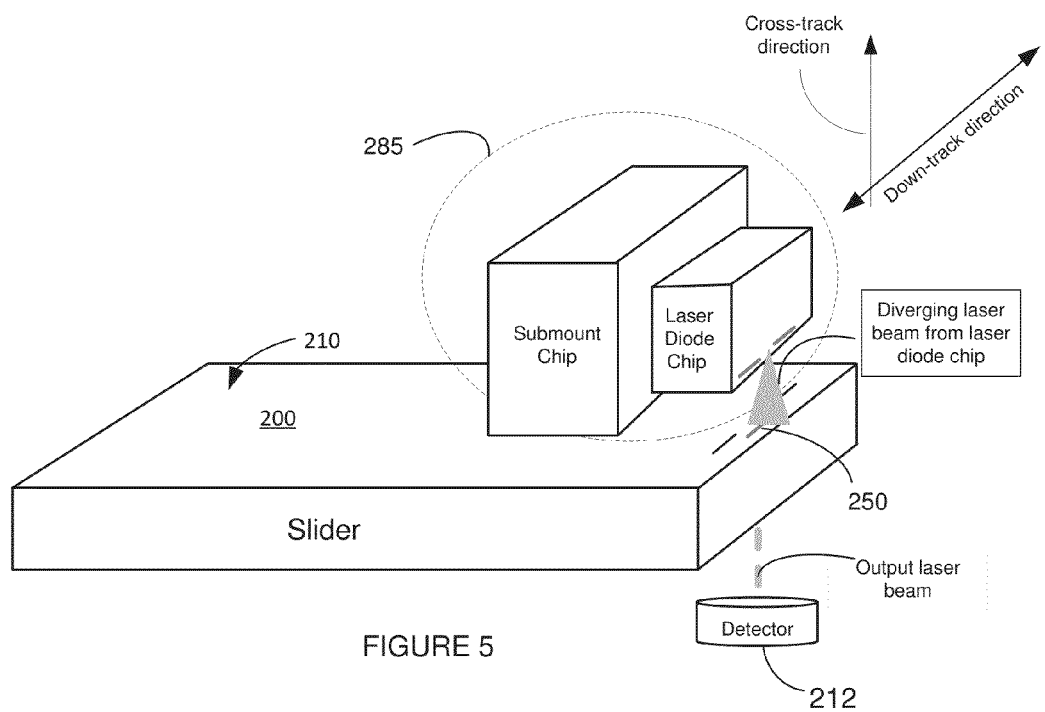
FIG. 5 illustrates a COSA chip irradiating the area of a waveguide in a down-track direction.

FIGS. 4 and 5 illustrate two different alternative illumination units (245 and 285) that are suitable for implementing one embodiment of the present alignment method. FIG. 4 illustrates a laser 245 that irradiates the slider 200 while scanning top surface 210 in a down-track direction. In some embodiments, the beam may be scanned in both a cross-track and a down-track direction. During irradiation, the slider may be incrementally moved with respect to the illumination unit from the initial alignment position. In addition, while slider 200 is being irradiated around waveguide 250, a detector 212 measures the light intensity exiting surface 215, which is the bottom surface of slider 200 (opposite top surface 210) in accordance with one embodiment of block 130. In some embodiments, lasers suitable for scanning via block 120 operate at a wavelength of approximately 830 nm. Although the laser 245 is illustrated as emitting a collimated beam, it will be appreciated that an uncollimated source may be used as well. If a collimated source is used to scan the light beam, then the distance from the source to the waveguide 250 may not be critical. However, when an uncollimated source is used, in certain embodiments, the uncollimated source may be operated at a power level between 1-10 milliwatts.

In alternative embodiments, illumination unit can be a COSA chip 285 as shown in FIG. 5. When a COSA chip 285 is used as the illumination unit, the distance between alignment markers 240 and the waveguide 250 can be less than 100 micrometers, due to the divergence of the beam from the laser diode chip. In one embodiment, COSA chip 285 is scanned in a down-track direction relative to slider 200. In other embodiments, COSA chip 285 is scanned in both cross-track and down-track directions relative to slider 200. In several embodiments, the waveguide position is identified when detector 212, such as a photodiode, detects the maximum light output from the slider 200.

Once the waveguide 250 is precisely located, the offset d of waveguide 250 from alignment markers 220 is calculated. It is desirable to compute offset d because of process variations during manufacturing that tend to affect alignment accuracy. Since the waveguide 250 and alignment markers 220 are fabricated separately, and a number of layers separate waveguide 250 from alignment markers 220, component variations are often inevitable. Although the exact position of waveguide 250 varies, the location of the waveguide 250 is not measured on every slider 200. With the offset d calculated, slider 200 is ready for bonding.

Figure 6:
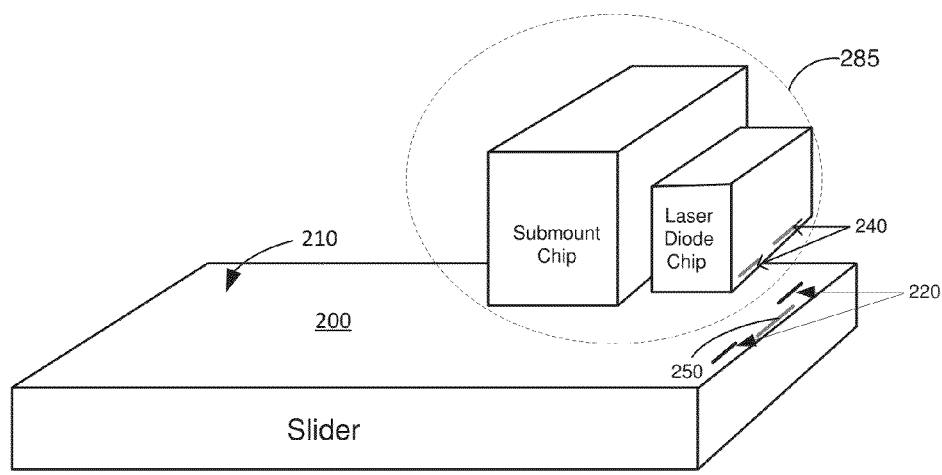
FIG. 6 is a perspective view of a slider being bonded to a chip.

Bonding station 310 resembles a passive alignment system due to the absence of an illumination source. In block 150, a pick and place robot moves the alignment markers 240 of illumination unit 285 into substantial alignment to alignment markers 250 as shown in FIG. 6. Next the position of slider 200 is adjusted by the previously calculated offset via block 150. Then the slider and illumination unit 285 are bonded together via block 160.

The measurements performed at measurement station 305 can be used to compensate for any offset d needed to accommodate component variation. For example, some sliders may vary in the thickness of layers separating waveguide 250 and markers 220, or have waveguides that are at a distance of ≥0.02 microns from alignment markers 220. Such variations can be detected before or after bonding at bonding station 310. For example, to detect a component variation prior to bonding, an alignment marker on slider 200 is used as a reference point (reference marker). Then the intensity of the light beam exiting the waveguide 250 is evaluated by a detector 212. When the maximum light intensity is located, optical alignment is established. Upon determining the optical alignment position, the distance from the alignment marker 220 is measured to ascertain if any large component variations are present. If variations exceeding 0.1 microns from one slider to another slider, then the sampling frequency of the waveguide 250 is increased. Alternatively, a post-bond optical test system can be used to determine the amount of light that is coupled into the waveguide. Variations among different parts can lead to significant reduction in the light intensity output from the waveguide, to thereby indicate that such variations are affecting the alignment accuracy. At which point, the next slider would be evaluated in measurement station 305 prior to bonding any further parts in bonding station 310.

In certain embodiments, it is not essential to pre-measure the waveguide prior to passive alignment at bonding station 310 if the waveguide is known to be within +/−0.1 microns of alignment markers 220. Thus, in such embodiments, a throughput of up to 100 sliders is possible before the waveguide is measured again. In this manner, the waveguide position data from the reference slider can substantially minimize misalignment due to part-to-part variation.

Accordingly, in certain embodiments, high throughput may be achieved by measuring the waveguide position in a sampling manner. For example, the waveguide position can be measured in one of every ten sliders. In other embodiments, the waveguide position can be measured in one of every 100 sliders. The frequency of the waveguide measurement will depend on the offset variation from the waveguide 250 to the alignment markers 220. The waveguide coordinates pursuant to block 140 are then dynamically transmitted to the bonding station to perform the passive alignment process. In some embodiments, block 140 contributes to high throughput yield by periodically sampling sliders to compute an offset, rather than measuring optical alignment positions on every single slider before bonding each slider 200 to an illumination unit 285.

Figure 7:
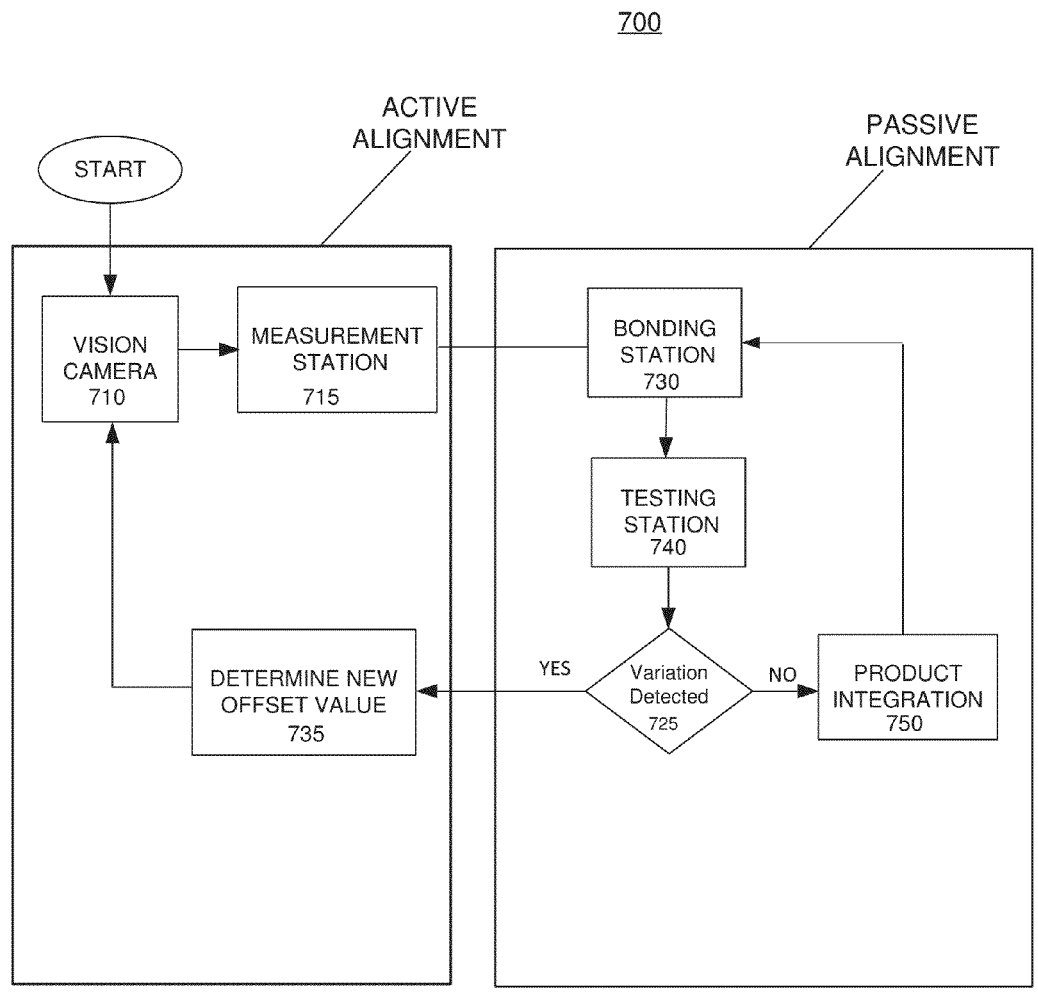
FIG. 7 illustrates a system according to one embodiment.

FIG. 7 summarizes yet another embodiment of the present disclosure. At the start of the system 700, a vision camera 710 can be used to identify the location of alignment markers 220 on slider 200. Once alignment markers 220 are identified, the slider 200 is transferred to measurement station 715 to measure the waveguide position. Measurement station 715 is analogous to station 305, discussed in reference to FIG. 3; however the two measurement stations are not the same. At measurement station 715, the degree of variation from part to part can be assessed. In certain embodiments, the offset d will be known after the waveguide position is measured at measurement station 715. Then a processor, or other calculating apparatus (not shown), can be used to calculate whether offset d exceeds an acceptable threshold (offset threshold), or otherwise determine if the sampling frequency should be increased. The waveguide sampling frequency can be adjusted depending on the level of component variation detected. For example, if large part-to-part variation is detected, more frequent measurement will be activated to account for the passive alignment offset. On the other hand, if a trivial variation in waveguide position is determined by the processor, then a less frequent measurement may be needed. In one embodiment, intelligence software can be used to automatically adjust the sampling frequency.

Once the processor determines whether a variation is acceptable or not, then the alignment process can proceed in either of two ways as indicated at decision block 725. If no variation or a trivial variation is detected, then the system will bond the slider to the illumination unit at bonding station 730. Subsequently, the bonded slider and illumination unit can then be integrated into a magnetic device via block 750. After product integration, bonding of additional sliders may continue based on the originally calculated offset d. On the other hand, a significant variation may be detected after bonding at testing station 740. If testing determines that the bonded slider varies substantially from the reference slider, then system 700 will proceed to begin measuring the alignment markers and waveguide position on a reference slider via block 735. In other words, if block 725 identifies a component variation that exceeds the offset threshold, then a new offset d is determined using a reference slider via block 735.

By performing several embodiments described above, alignment of components can be achieved with accuracy and high throughput. The method and system of the disclosure are primarily designed for submicron bonding accuracy. It is estimated that by adopting the aforementioned hybrid alignment system that the bonding cycle for aligning multiple components may be reduced by about 3-5 seconds. As a result, the disk drives and other devices fabricated with components aligned by the methods described herein may have improved performance.

What is claimed is:

1. An alignment method for bonding a first component to a second component comprising:
   providing a plurality of sliders, each slider having alignment markers on a first portion of a top surface, and a waveguide adjacent to the alignment markers, wherein each slider comprises the first component;
   providing a plurality of illumination units with alignment markers, wherein each illumination unit comprises the second component;
   substantially aligning the alignment markers of the first component to the alignment markers of the second component to establish an initial alignment position;
   irradiating a light source onto the slider while evaluating light emitted from the waveguide on a bottom surface of the first component, and incrementally moving the first component with respect to the second component from the initial alignment position until light emitted from the waveguide at the bottom surface of the first component indicates a position of optical alignment has been located;
   calculating an offset from the initial alignment position of the slider to the optical alignment position; and
   bonding a plurality of first components to a plurality of second components by placing each one of the first components in the initial alignment position relative to a corresponding one of the second components, and then adjusting the position of each one of the first components by the calculated offset prior to bonding the first and second components together.

2. The method of claim 1, further comprising periodically recalculating the offset using a different slider when either a misalignment of the two components is detected or an offset threshold is exceeded.

3. The method of claim 1, wherein the light source is part of the illumination unit.

4. The method of claim 1, wherein the light source is not part of the illumination unit.

5. The method of claim 1, wherein irradiating a light source on the slider comprises scanning a light beam around the waveguide in a down-track direction across a portion of the front surface of the slider.

6. The method of claim 1, wherein irradiating a light source on the slider comprises scanning a light beam around the waveguide in a cross-track direction and a down-track direction across a portion of the front surface of the slider.

7. The method of claim 1, wherein the light source is uncollimated.

8. The method of claim 7, wherein the uncollimated light source is maintained at a distance of 50 micrometers or less from the waveguide during irradiation of the slider.

9. The method of claim 2, wherein the offset is recalculated if a manufacturing variance is detected in a slider before bonding.

10. The method of claim 2, wherein the offset is recalculated by establishing an initial alignment position for the first component;
    irradiating a light source on the first component while evaluating light emitted from the waveguide on a bottom surface of the first component, and incrementally moving the first component with respect to the second component from the initial alignment position until light emitted from the waveguide at the bottom surface of the first component indicates a position of optical alignment has been located;
    determining the recalculated offset by measuring the distance from the initial alignment position of the slider to the optical alignment position; and
    bonding a plurality of first components to a plurality of second components by placing each of the first components in the initial alignment position relative to a corresponding one of the second components, and then adjusting the position of the first component by the recalculated offset prior to bonding the first and second components together.

11. The method of claim 1, wherein the second component is stationary during alignment of the first and second components.

12. The method of claim 1, further comprising measuring the amount of light that is coupled into the waveguide after the first and second components are bonded to determine whether first and second components are misaligned.

13. A method for bonding a slider to an illumination unit comprising:
    placing the slider in an initial alignment position relative to the illumination unit;
    locating an optical alignment position between the slider and the illumination unit by irradiating the slider with a light source;
    calculating a distance between the initial alignment position and the optical alignment position, wherein the calculated distance comprises an offset; and
    bonding individual sliders to individual illumination units after adjusting the initial alignment position for each individual slider by the offset.

* * * * *